United States Patent [19]

Dell

[11] Patent Number: 4,878,800

[45] Date of Patent: Nov. 7, 1989

[54] PORTABLE UNLOADING PLATFORM AND RAMP

[76] Inventor: Travis E. Dell, 2609 N. Ellis Loop Rd., Plant City, Fla. 33566

[21] Appl. No.: 168,245

[22] Filed: Mar. 15, 1988

[51] Int. Cl.[4] .............................................. B65G 67/00
[52] U.S. Cl. ..................... 414/401; 414/537; 414/522; 414/523; 296/37.6; 224/42.41; 280/166
[58] Field of Search ............... 414/401, 537, 538, 558, 414/522, 921, 523; 193/4; 280/43.13, 166, 641; 296/37.1, 37.6, 183; 14/71.1, 72.5; 224/42.23, 42.41, 42.08, 42.21, 42.44; 108/44, 48

[56] References Cited

U.S. PATENT DOCUMENTS

| | | | |
|---|---|---|---|
| 2,457,380 | 12/1948 | Kelberer | 280/164 |
| 2,788,137 | 12/1954 | Harkness | 214/83.24 |
| 3,168,959 | 2/1965 | Chandler et al. | 414/538 X |
| 3,263,835 | 8/1966 | Lugash | 414/558 |
| 3,441,153 | 4/1969 | Handley | 414/537 |
| 3,559,826 | 2/1971 | Abromavage et al. | 414/537 |
| 3,599,810 | 8/1971 | Wanko | 214/77 R |
| 3,743,121 | 7/1973 | Langer | 214/44 R |
| 4,020,957 | 5/1977 | Wren | 14/71.1 X |
| 4,084,714 | 4/1978 | Williams | 214/515 |
| 4,131,209 | 12/1978 | Manning | 214/85 |
| 4,242,032 | 12/1980 | Whiteman et al. | 14/71.1 X |
| 4,347,638 | 9/1982 | Weaver | 14/71.1 |
| 4,624,619 | 11/1986 | Uher | 14/71.1 X |
| 4,627,784 | 12/1986 | Collins | 414/558 X |
| 4,744,590 | 5/1988 | Chesney | 296/37.1 X |

Primary Examiner—Robert J. Spar
Assistant Examiner—James R. Bidwell
Attorney, Agent, or Firm—Fleit, Jacobson, Cohn, Price, Holman & Stern

[57] ABSTRACT

A loading or unloading platform is located and secured in a frame mounted beneath the bottom of a semi-trailer. The platform is removable from underneath the semi-trailer by releasing a lock and pulling the platform out from under the trailer after extension of the retractable wheels of the platform. The platform is then available for use in a locked position adjacent to any door of the semi-trailer. A ramp is used in combination with the platform. The ramp is located underneath the bottom of the semi-trailer in two spaced-apart mounting brackets, one mounting bracket for each end of the ramp. One mounting bracket is fixed in position and includes a lock for locking a bottom end of the ramp underneath the semi-trailer. The other mounting bracket includes a swivel turntable and a pivoting holder for engaging the top end of the ramp.

16 Claims, 3 Drawing Sheets

PORTABLE UNLOADING PLATFORM AND RAMP

FIELD OF THE INVENTION

A portable unloading platform and ramp are removably mounted underneath the bottom of a semi-trailer. The platform is withdrawn from under the semi-trailer and attached below a door of the trailer for loading or unloading materials at various stations. The ramp is withdrawn from under the semi-trailer and wheeled to a position adjacent to the platform and mounted thereon.

BACKGROUND OF THE INVENTION

When making deliveries from a semi-trailer, it is necessary to provide some type of unloading platform if an operator is to enter the semi-trailer and carry goods therefrom to a receiving station. Power lift tailgates for semi-trailers are known to be permanently provided on a vehicle. The tailgates are power operated and adjustable in height. If a power lift tailgate is unavailable, an operator would climb into the semi-trailer through the side door and move goods to the door, then jump to the ground, and carry goods from the side door of the semi-trailer. An alternate arrangement was to have an unloading platform and ramp located at each receiving station so that an operator could set up the platform adjacent to the semi-trailer after arriving at a receiving station and use the ramp and platform to help unload the semi-trailer.

U.S. Pat. No. 3,599,810 to Wanko discloses a load-carrying vehicle having a supporting frame mounted below a load-carrying bed. A loading platform is provided which includes a slidable frame mounted in the supporting frame for movement between extended and withdrawn positions. Ground support castors support the slidable frame, which extends beyond one side of the load-carrying vehicle. The platform is connected to a mounting assembly, which is fixed to the trailer. The platform only extends from one side of the vehicle and is used only in combination with the vehicle to which it is permanently fixed.

U.S. Pat. No. 3,743,121 to Langer discloses an unloading chute assembly and means for detachably carrying the assembly on a vehicle. A hydraulic loading chute is carried by a semi-trailer so that it is readily available for unloading the trailer at its destination. Support legs and their attached wheels are lowered by a hydraulic cylinder. When fully lowered and locked, the chute will clear the support brackets and be moved by a hydraulic cylinder to a position of use.

Other patents related to this field include U.S. Pat. Nos. 2,457,380 to Kelberer; 2,788,137 to Harkness; 4,084,714 to Williams; and 4,131,209 to Manning.

SUMMARY OF THE INVENTION

The present invention includes a loading or unloading platform which is located and secured in a frame mounted beneath the bottom of a semi-trailer. The platform is removable from underneath the semi-trailer by releasing a lock and pulling the platform out from under the trailer after extension of the retractable wheels of the platform. The platform is then available for use in a locked position adjacent to any door of the semi-trailer.

For return of the platform underneath the semi-trailer, the platform is pushed onto the inclined mounting brackets located underneath the bottom of the semi-trailer. As the platform is pushed further into the mounting brackets, the wheels of the platform are lifted off the ground. The wheels are then moved to their retracted position and locked in that position for transporting with the semi-trailer.

The present invention also includes a ramp used in combination with the platform. The ramp is located underneath the bottom of the semi-trailer in two spaced-apart mounting brackets, one mounting bracket for each end of the ramp. One mounting bracket is fixed in position and includes a lock for locking a bottom end of the ramp underneath the semi-trailer. The other mounting bracket includes a swivel turntable and a pivoting holder for engaging the top end of the ramp.

For withdrawing the ramp from underneath the semi-trailer, the wheels of the ramp are unlocked and moved from their retracted to their extended position. At this position, the wheels of the ramp are located above the ground. The fixed mounting bracket is then unlocked to allow movement of the ramp from the fixed bracket. The top end of the ramp is kept in the swivel mounting bracket, as the operator moves the bottom end of the ramp away from the semi-trailer. After clearing the semi-trailer, the bottom end of the ramp is lowered until the wheels of the ramp engage the ground. The top end of the ramp is then withdrawn from underneath the semi-trailer. The ramp is wheeled over to a position of intended use, including placing the top end of the ramp on top of the platform so as to lift the wheels of the ramp off the ground to avoid any movement of the ramp during use.

For storing the ramp underneath the semi-trailer, the pivotable holder of the swivel bracket is angled to contact and guide the top end of the ramp into the turntable bracket. The ramp is then swung towards the fixed bracket so that the bottom end of the ramp is placed into the fixed bracket and locked into position for transporting.

It is an object of the present invention to provide a platform and ramp removably secured underneath the bottom of a semi-trailer.

It is another object of the present invention to remove a platform from underneath the bottom of a semi-trailer and locate it adjacent the side of the semi-trailer, where it is locked in position below any door of the trailer and having a ramp removed from underneath the semi-trailer and positioned on the platform for loading or unloading of the semi-trailer.

It is still yet another object of the present invention to remove a platform from underneath the bottom of a semi-trailer and locate it adjacent the side or rear end of the semi-trailer, where it is locked in position below a door and having a ramp removed from underneath the semi-trailer and positioned on the platform for loading or unloading of the semi-trailer through the side door and the platform and ramp being loadable back underneath the semi-trailer for storage.

These and other objects of the invention, as well as many of the intended advantages thereof, will become more readily apparent when reference is made to the following description taken in conjunction with the accompanying drawings.

DETAILED DESCRIPTION OF THE PREFERRED EMBODIMENTS

Figure 1:
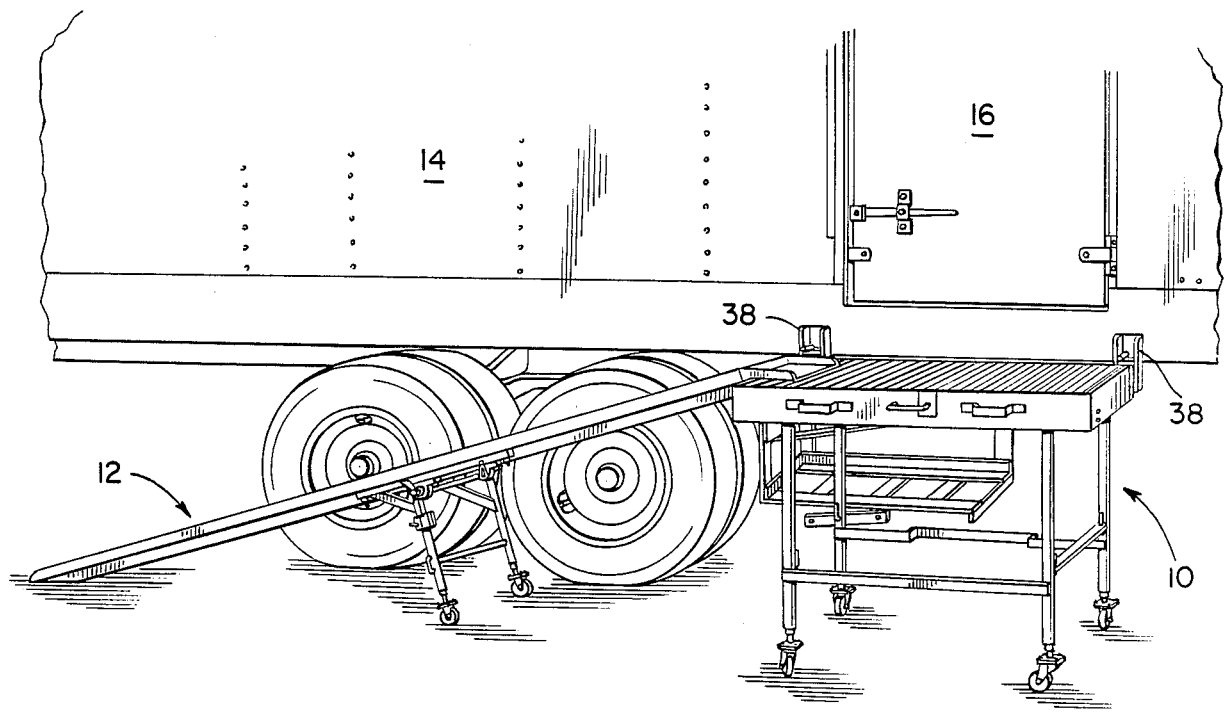
FIG. 1 is a perspective view of a platform and a ramp in an extended position located adjacent to a semi-trailer.

In describing the preferred embodiments of the invention illustrated in the drawings, specific terminology will be resorted to for the sake of clarity. However, the invention is not intended to be limited to the specific terms so selected, and it is to be understood that each specific term includes all technical equivalents which operate in a similar manner to accomplish a similar purpose.

With reference to the drawings in general, and to FIGS. 1 through 4 in particular, a platform 10 and an unloading ramp 12 embodying the teachings of the subject invention are shown in FIG. 1. In FIG. 1, the platform 10 and ramp 12 are shown in their position of intended use adjacent to a semi-trailer 14 having a loading and unloading side door 16. It is intended that the platform can be located below any door of a semi-trailer to assist in loading or unloading of the semi-trailer.

Figure 2:
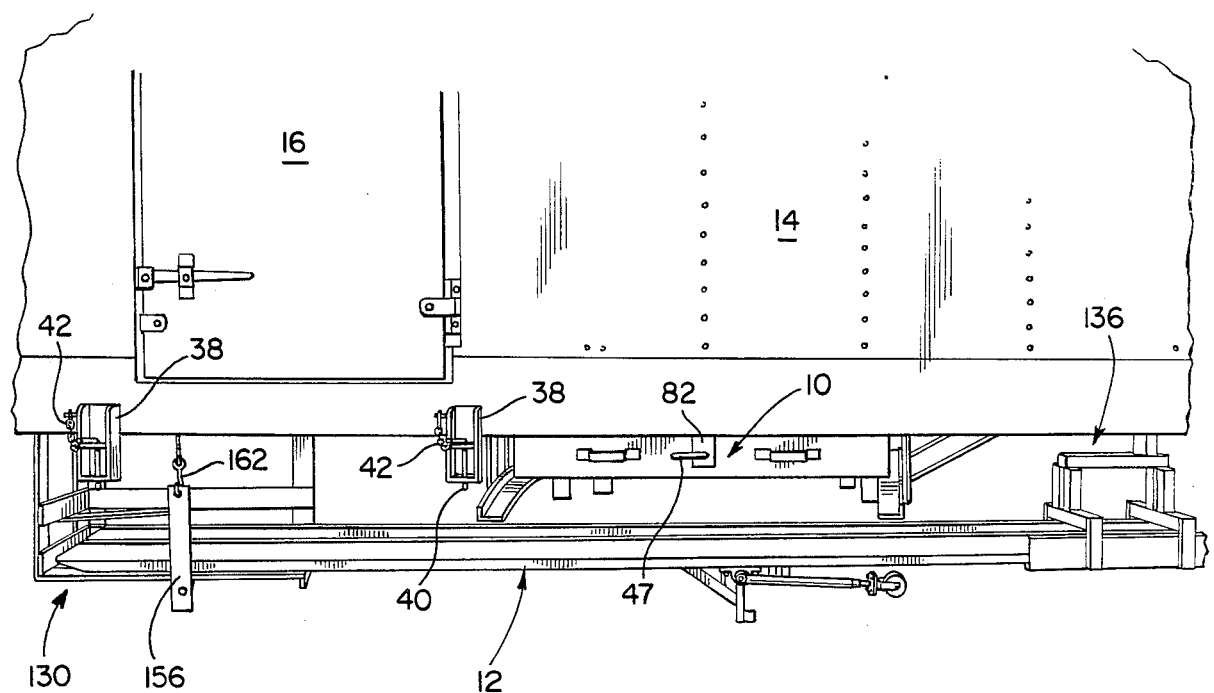
FIG. 2 is a side view of the platform and ramp of FIG. 1, shown in a retracted position located in their respective carriers underneath the bottom of the semi-trailer.

In FIG. 2, the platform 10 and ramp 12 are shown in their positions of storage beneath the semi-trailer 14. The securing of the platform 10 and ramp 12 beneath the semi-trailer and the release of the platform and ramp from their storage positions to a position adjacent to the semi-trailer will be explained in greater detail with reference to FIGS. 3 and 4.

Figure 3:
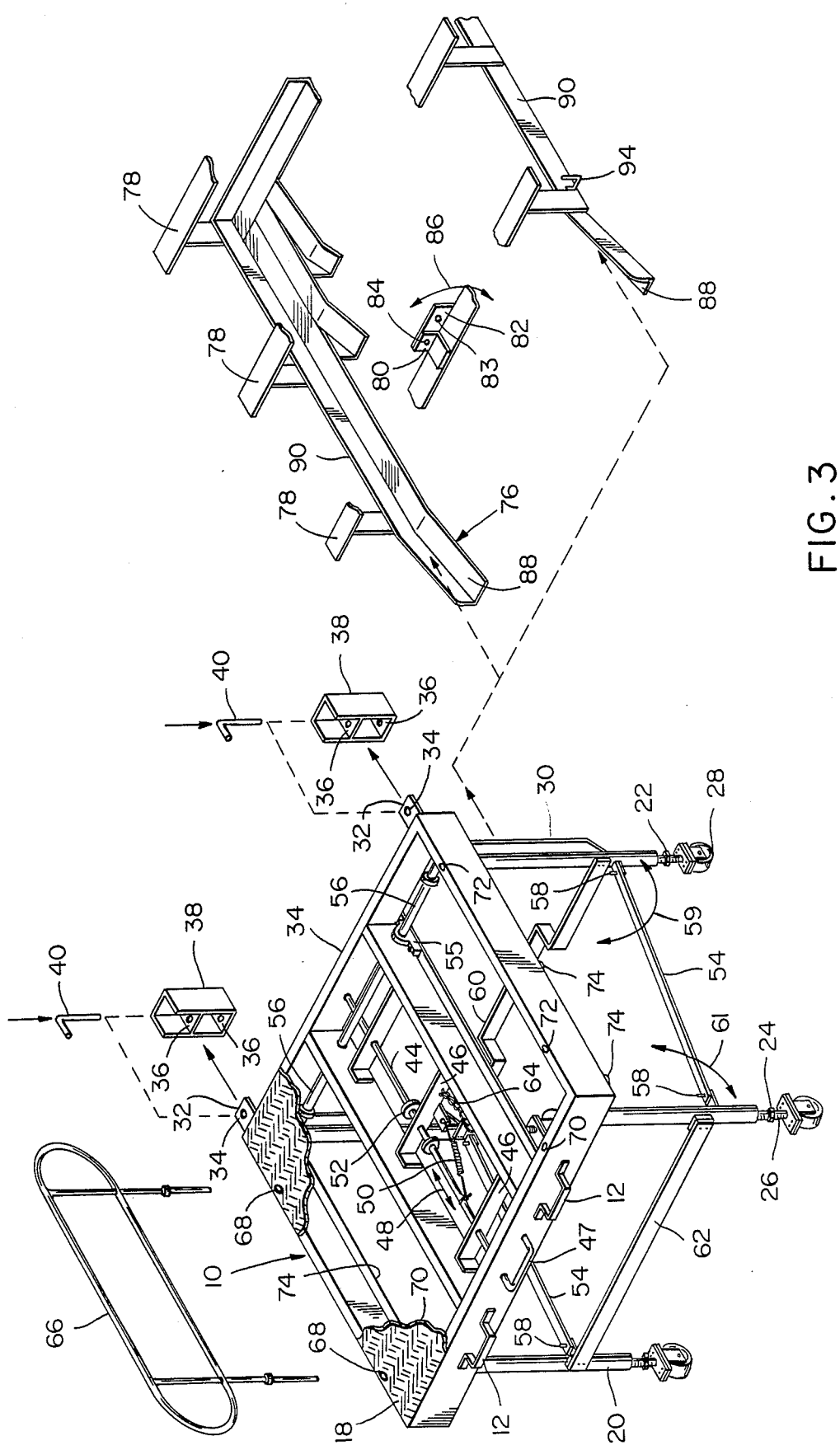
FIG. 3 is an exploded view, partly in section, of the platform and mounting bracket which is normally located underneath the bottom of a semi-trailer for mounting the platform underneath a semi-trailer.

In FIG. 3, the platform 10 is shown as including a corrugated aluminum deck plate 18. Four pivotally mounted platform legs 20 are shown in an extended position, locked to support the platform 10. The length of each leg 20 is adjusted by an adjustment assembly 22, which includes a locking nut 24 located on a threaded shaft 26. At one end of the threaded shaft 26 is a castor wheel 28. The opposite end of the shaft 26 is threaded into the bottom of the leg 20. A leg-folding guide 3 guides the positioning of the legs 20 beneath the platform 10 when moved to a retracted position, secured underneath the bottom of the semi-trailer.

Projection tabs 32 extend from a side 34 of the platform. Each tab 32 includes an opening 34, which is placed between the tiers 36 of trailer lock box 38. Lock boxes 38 are secured to the side of a semi-trailer below the side door 16, as shown in FIGS. 1 and 2. Lock boxes 38 are secured below other doors of the semi-trailer to locate and lock the platform 10 at any desired door for loading or unloading of the trailer. A locking pin 40 passes through an opening in each of the tiers 36 of the box 38 and also through the opening 34 of the tabs 32 of the platform so as to lock the platform in position below the side door 16 and adjacent to the semi-trailer 14. A chain 42 attaches the pins 40 to the lock box 38.

A transporting lock shaft 44 for the platform 10 is slidably mounted in cross-braces 46. The lock shaft 44 terminates in a U-shaped handle 47. As shown in FIG. 3, the left-hand leg of handle 47 is a continuation of the shaft extending through the brackets 46. The right-hand leg of the U-shaped handle 47 does not extend through the side of the platform 10 and is used to engage a carrier lock 82 with the platform, which will be described later. The shaft 44 is movable in the direction indicated by arrow 48 as biased by spring 50. Adjustment set collars 52 determine the extent of movement of the shaft 44 in the direction of arrow 48. The shaft 44 is shown in its normal biased position.

Cross-braces 54 interconnect the rear legs 20, which are interconnected by pivot shaft 56 mounted in bearings 55, and the front legs 20 interconnected by a pivot shaft (not shown). The cross-braces 54 include an opening in each of their ends, which fit over L-shaped hooks 58, which project upwardly from each of the legs 20.

When leg braces 54 are removed and the rear legs are folded upwardly underneath the platform 10 in the direction of arrows 59, clearance is provided around the lock shaft 44 assembly by U-shaped interconnecting leg brace 60. The forward legs connected to straight leg brace 62 are then folded under the platform in the direction of arrows 61 and under the rear legs. A safety leg-locking chain 64 is then looped around and secured to leg brace 62 to secure all four legs 20 under the platform 10.

A guard rail 66 is positionable in any one of the sets of openings 68, 70, or 72, which are positioned about three sides of the platform. The platform also includes ball bearing transfer guides 74 located on two sides of the bottom edge of the platform for aiding and guiding the platform into a platform carrier 76.

The platform carrier 76 is mounted on the bottom of a semi-trailer. Cross-braces 78 extend across the bottom of the semi-trailer. Pivotably mounted on L-shaped support bracket 80 is carrier lock 82, which is pivotably mounted about pin 84 for movement in the direction of arrow 86. The carrier lock is normally horizontally positioned and, when locking the platform 10 on the carrier 76, is located in a vertical position, as shown in FIG. 2.

The leading portion 88 of the two spaced apart L-shaped guide rails 90 which form part of the carrier are angled downwardly to guide a platform of any height into the platform carrier 76. As the side 34 of the platform engages leading portions 88, the platform, as moved by application of a pushing force on handles 92, engages the portions 88 at the side 34. Continued pushing of the platform into the carrier lifts the wheels of the platform off of the ground.

After the platform is pushed completely into the carrier, the leg braces 54 are removed and placed on support hooks 94, which are spaced longitudinally along the carrier for transporting the leg braces 54. The rear set of legs are moved upward to a retracted position in the direction of arrows 59 and folded under the platform, and the front legs are moved to a retracted position in the direction of arrows 61 to be positioned below the rear legs. The safety leg lock is then secured to the leg brace 62 to lock the front and rear sets of legs underneath the platform for transport.

The carrier lock 82 is then rotated about its pivot axis 84 in the direction of arrow 86 to a position in front of the platform. Handle 47 is then pulled from the platform against the bias of spring 50, and the right-hand end of the handle is moved to engage opening 83 in the lock 82 for securing the platform underneath the semi-trailer by the bias force of the spring 50.

To remove the platform 10 from underneath the bottom of the semi-trailer, the rear and front legs are pivoted in the direction of arrows 59 and 61 and interconnected with leg braces 54. At this point, the castors 28 are positioned spaced from the ground and can be adjusted for an approximate height required for loading or unloading of the semi-trailer. The handle 46 is then withdrawn to release its locking engagement with carrier lock 82, and the platform is pulled by handles 92 from the platform carrier. As the platform slides down portions of 88 of the guide rails 90, the castors engage the ground to support the platform. The platform is then positioned such that the tabs 32 are positioned within box 38, and pins 40 pass through the box 38 and the openings 34 of the tabs 32 to secure the platform adjacent the side of a semi-trailer.

Figure 4:
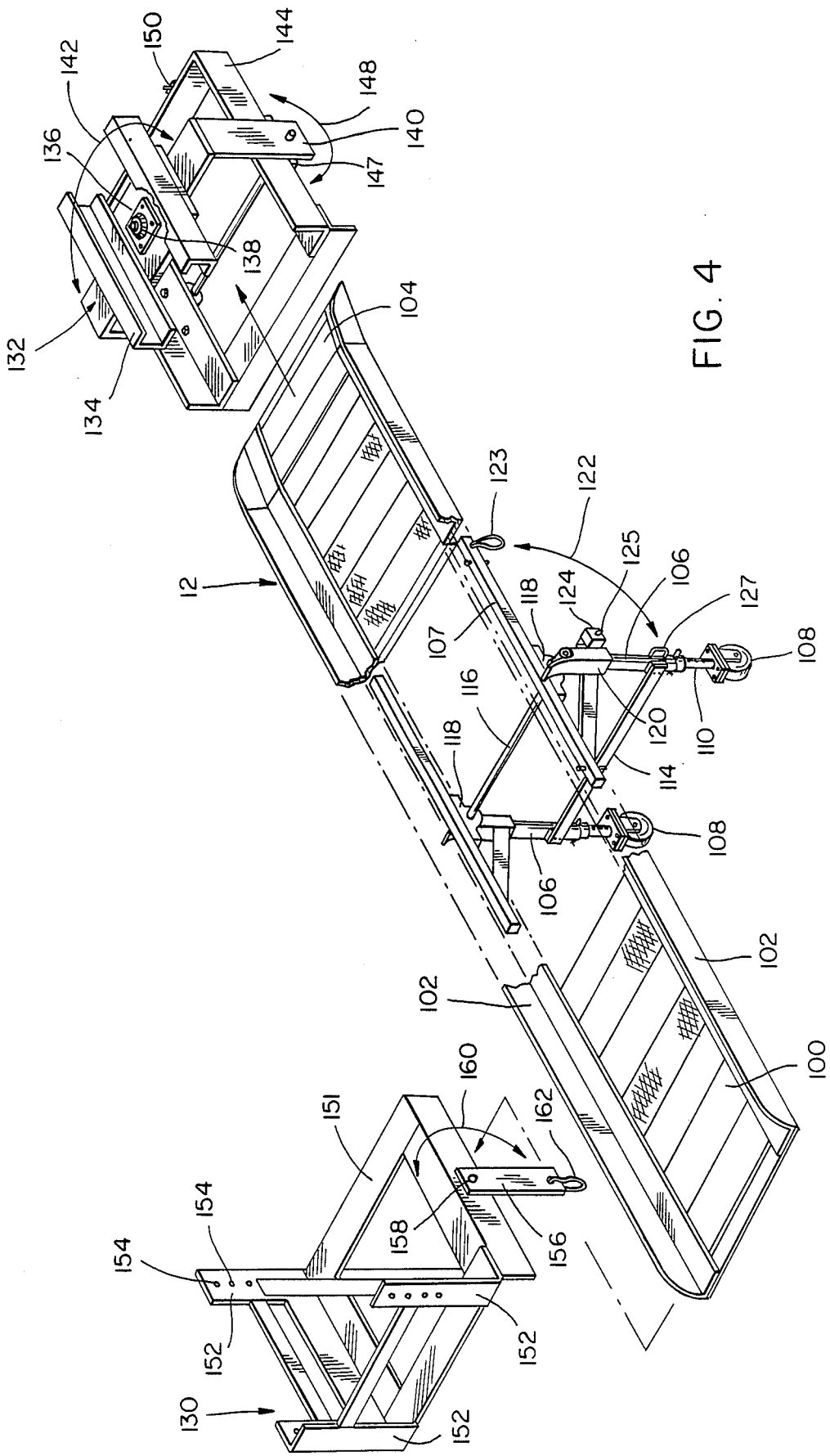
FIG. 4 is an exploded view, partly in section, of the ramp and mounting bracket which is normally located underneath the bottom of a semi-trailer for mounting the ramp underneath a semi-trailer.

In FIG. 4, the loading ramp and its carrier frames are shown. The ramp 12 includes a longitudinally extending flat base portion 100, having two perpendicularly extending side rails 102. At a leading end of the base 100 is an angled portion 104. The portion 104 is for placement upon the top surface of platform 10 and to anchor the ramp on the platform.

Secured to the underside of the ramp 12 on brackets 107 are two legs 106. At the bottom of each leg is a castor 108. The castors 108 are mounted on an adjustable shaft 110, which includes holes through which a cotter pin 112 may be placed for adjusting the height of the legs. A brace 114 interconnects the two legs 106 at an intermediate portion thereof. A shaft 116 extends through bearings 118 located on opposite sides of the ramp. The shaft 116 interconnects a top end of each leg for pivotable movement of the two legs.

A leg support and stop 120 provides support for the legs after the legs have been moved to an extended position along the direction shown by arrow 122, as shown in FIG. 4. After the legs have been pivoted to their extended positions, a leg lock 124 secures the legs in the extended position. Leg lock 124 includes a screw pin 125, which is unscrewed to allow insertion of each leg 106 in an extended position and rescrewed to lock the leg between the leg support stop 120 and the screw pin 125. To retract the legs, the screw pin 125 is withdrawn, and the legs moved in the direction of arrows 122 until aligned parallel with the ramp 12. At this position, leg lock 123 is secured around bracket 127 to hold the legs in the retracted position.

The carrier for the ramp includes two portions: a stationary carrier 130 and a swivel turntable 132.

The swivel turntable 132 is mounted on two rails 134, which are secured to the bottom of the semi-trailer and extend along the length of the trailer. Interconnected between the two rails 134 is swivel plate 136. Extending through the swivel plate is a swivel bearing 138, which interconnects the plate 136 and a U-shaped bracket 140. The bracket is rotatable 360°, as indicated by arrow 142, about the swivel bearing 138. In addition, a ramp carrier frame 144 is pivotably mounted on the bracket 140 for pivoting about shaft 146 in bearing 147 in the direction of arrow 148. The degree of tilt about shaft 146 is adjustable by tilt adjustor 150, which stops the tilting of the frame 144 beyond a predetermined position.

Stationary carrier 130 includes flat, horizontally extending base rails 151, from which attachment brackets 152 extend vertically and which are secured to the bottom of a semi-trailer at a predetermined height, according to the position of bolts extending through holes 154 of each bracket 152. At one side of the carrier 130, there are no projections so as to allow the swinging out of the bottom end of the ramp from the carrier.

A carrier lock 156 is pivotably mounted about pin 158 to pivot in the direction of arrow 160 for locking or releasing the ramp from the carrier 130. A hook 162 is secured to the carrier lock 156, as shown in FIG. 2, to lock the carrier lock in a vertical position projecting above the base rails 150, for locking the ramp in the carrier 130 for transporting underneath the semi-trailer.

To remove the ramp 12 from underneath the semi-trailer the leg lock 123 is released and the legs 106 swung to an extended position towards the ground in the direction of arrow 122. The screw pin 125 is removed and the legs moved up against the leg support stop 120. The screw pin is reinserted to lock the legs in their extended position. At this point, the wheels 108 are located above the ground to provide a clearance for swinging of the ramp from underneath the semi-trailer.

The carrier lock 156 is then disconnected from underneath the semi-trailer and allowed to swing 180° from the position shown in FIG. 2 to the position shown in FIG. 4. The bottom end of the ramp is pulled out from the carrier 13 and from underneath the semi-trailer. While maintaining a substantially horizontal position for the ramp, the operator walks with the ramp to extend the ramp at an angle of approximately 90° with respect to the semi-trailer.

The top end of the ramp is pivoted with the swivel turntable 132 until the operator has reached the position of extending the ramp at approximately 90° with respect to the semi-trailer. The ramp is then lowered until the wheels contact the ground, and then the ramp is pulled out from the swivel turntable 132 until the ramp is clear of the bottom of the semi-trailer. The ramp is then available for use or may be positioned adjacent to the semi-trailer until the unloading platform 10 is set up below the side door of the semi-trailer, and then the ramp may be placed, with portion 104, on top of the platform 10.

The two legs with castors 108 provide for ease of movement of the ramp by balancing of the ramp on the castors and having an operator move the ramp by holding the ramp at one end. The ramp is moved to a position adjacent to an unloading platform. Portion 104 is then lifted and placed on top of the platform to elevate the castors above the ground. The ramp is thereby fixed in position, the castors only being used to move the ramp from place to place.

For storing the ramp underneath the trailer, the ramp front end can be of any height because bracket 140 is tiltable to accept the angle at which the front end of the ramp is fed into the swivel turntable. After the front end of the ramp is loaded into the swivel turntable, the turntable and ramp are swiveled to place the bottom end of the ramp into the fixed carrier 130. This raises the legs of the ramp off the ground. The bottom end of the ramp is then locked in position in the fixed carrier, and the legs are retracted to the position extending parallel to the ramp and locked in place for transporting.

Having described the invention, many modifications thereto will become apparent to those skilled in the art to which it pertains, without deviating from the spirit of the invention, as defined by the scope of the appended claims.

I claim:

1. In combination, a platform and ramp for loading or unloading of a semi-trailer, said combination comprising:

a platform, said platform including legs extendable between a retracted and an extended position, first carrier means mounted on the bottom of said semi-trailer for removably securing said platform beneath the bottom of said semi-trailer, a ramp, said ramp including legs extendable between a retracted and an extended position, and second carrier means mounted on the bottom of said semi-trailer for removably securing said ramp beneath the bottom of said semi-trailer, said second carrier means including a fixed mounting bracket and a swivel turntable spaced from one another for holding the ends of said ramp, said fixed mounting bracket and said swivel turntable being located on opposite sides of said first carrier means, said swivel turntable including a pivotable bracket for receiving a top end of said ramp at variable angles during loading of said ramp into said second carrier means.

2. In combination, a platform and ramp for loading or unloading of a semi-trailer according to claim 1, wherein said first carrier means includes a pivotable carrier lock cooperating with a handle slidably mounted on said platform for locking said platform beneath the bottom of said semi-trailer.

3. In combination, a platform and ramp for loading or unloading of a semi-trailer according to claim 2, wherein said first carrier means further includes inclined guide rails for assisting in lifting a leading edge of said platform as said platform is pushed into said first carrier means for storage of said platform beneath the bottom of said semi-trailer.

4. In combination, a platform and ramp for loading or unloading of a semi-trailer according to claim 1, wherein said platform is detachable from said semi-trailer and includes means cooperating with lock means located on said semi-trailer below each door to said semi-trailer for locking said platform below a chosen door to said semi-trailer.

5. In combination, a platform and ramp for loading or unloading of a semi-trailer according to claim 1, wherein said ramp extends below said platform when said ramp and said platform are located in their respective carrier means.

6. In combination, a platform and ramp for loading or unloading of a semi-trailer according to claim 1, wherein said platform includes four legs, two legs being mounted on a first pivotable shaft and two legs mounted on a second pivotable shaft for pivoting said first pivotable shaft and said second pivotable shaft towards each other and thereby moving said legs to their retracted position.

7. In combination, a platform and ramp for loading or unloading of a semi-trailer according to claim 6, wherein removable leg braces interconnect said two legs mounted on said first pivotable shaft and said two legs mounted on said second pivotable shaft in said extended position of said four legs.

8. In combination, a platform and ramp for loading or unloading of a semi-trailer according to claim 1, wherein said legs of said ramp are spaced above the ground when said ramp is located in said second carrier means and said legs are in said extended position.

9. A ramp assembly for loading or unloading of a semi-trailer, said ramp comprising:

a flat base portion;

bracket means mounted to a bottom surface of said base portion for engaging support legs, said bracket means including legs pivotable between an extended position and a retracted position, means for securing said legs in an extended position, and means for securing said legs in said retracted position, and carrier means mounted on the bottom of said semi-trailer for removably securing the ramp beneath the bottom of said semi-trailer, said carrier means including a fixed mounting bracket and a swivel turntable spaced from one another for holding the ends of said base portion, said swivel turntable including a pivotable bracket for receiving a top end of said base portion at variable angles during loading of the ramp into said carrier means.

10. A ramp assembly for loading or unloading of a semi-trailer according to claim 9, wherein said swivel turntable surrounds a top end of said base portion and said fixed mounting bracket includes an opening for insertion of a bottom end of said base portion and means for locking said bottom end in said fixed mounting bracket by spanning said opening.

11. A ramp assembly for loading or unloading of a semi-trailer according to claim 9, wherein a top end of said base portion is inclined with respect to the remainder of said base portion for positioning said top end on top of a platform.

12. A ramp assembly for loading or unloading of a semi-trailer, said ramp assembly comprising:

a flat base portion, bracket means mounted to a bottom surface of said base portion for engaging support legs, said bracket means including legs pivotable between an extended position and a retracted position, means for securing said legs in said extended position, means for securing said legs in said extended position, and carrier means mounted on the bottom of said semi-trailer for removably securing the ramp beneath the bottom of said semi-trailer, said carrier means including a fixed mounting bracket and a swivel turntable spaced from one another for holding the ends of said base portion, said swivel turntable surrounding a top end of said base portion and said fixed mounting bracket includes an opening for insertion of a bottom end of said base portion and means for locking said bottom end in said fixed mounting bracket.

13. An apparatus for loading or unloading of a semi-trailer having at least side and rear doors, said apparatus comprising:

a platform having a flat top surface, said platform being stored underneath the semi-trailer and being detachable from the semi-trailer for movement around the semi-trailer, legs extending from said platform and movable between an extended position and a retracted position, carrier means mounted underneath the semi-trailer for transporting and storage of said platform when said legs are in said retracted position, lock means mounted on the semi-trailer below each of said at least side and rear doors to the semi-trailer for locking said platform below a chosen door of the semi-trailer, means mounted on said platform and cooperating with said lock means to lock said platform at the chosen door of the semi-trailer when said legs are in said extended position, and means for guiding said platform to a height where said legs in said extended position are spaced above the ground and for locating said platform in said carrier means.

14. An apparatus for loading or unloading of a semi-trailer according to claim 13, wherein said means for guiding are guide rails.

15. An apparatus for loading or unloading of a semi-trailer according to claim 14, wherein a leading end of said guide rails are inclined to guide said platform during the ascent of said platform into said carrier means.

16. An apparatus for loading or unloading of a semi-trailer according to claim 14, wherein said means for guiding are part of said carrier means.

* * * * *